(12) United States Patent
Cheng

(10) Patent No.: US 12,562,642 B2
(45) Date of Patent: Feb. 24, 2026

(54) CHARGE PUMP CIRCUITS AND METHODS FOR OPERATING THE SAME

(71) Applicant: Taiwan Semiconductor Manufacturing Company, Ltd., Hsinchu (TW)

(72) Inventor: Wan-Hsueh Cheng, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 208 days.

(21) Appl. No.: 18/405,904

(22) Filed: Jan. 5, 2024

(65) Prior Publication Data

US 2025/0070657 A1 Feb. 27, 2025

Related U.S. Application Data

(60) Provisional application No. 63/607,870, filed on Dec. 8, 2023, provisional application No. 63/578,201, filed on Aug. 23, 2023.

(51) Int. Cl.
| | |
|---|---|
| *H02M 3/00* | (2006.01) |
| *H02M 3/07* | (2006.01) |
| *H02M 3/158* | (2006.01) |

(52) U.S. Cl.
CPC ............ *H02M 3/07* (2013.01); *H02M 3/158* (2013.01)

(58) Field of Classification Search
CPC ........ H02M 3/07; H02M 3/158; H02M 3/071; H02M 3/077
See application file for complete search history.

(56) References Cited

U.S. PATENT DOCUMENTS

| | | | | |
|---|---|---|---|---|
| 2011/0221512 A1* | 9/2011 | Wu | ........................ | H02M 3/073 |
| | | | | 327/536 |
| 2012/0182058 A1* | 7/2012 | Yang | .................. | H03K 5/15013 |
| | | | | 327/295 |

(Continued)

FOREIGN PATENT DOCUMENTS

| | | |
|---|---|---|
| TW | 201131954 A | 9/2011 |
| TW | 202005243 A | 1/2020 |

OTHER PUBLICATIONS

Office Action issued in connection with Taiwan Appl. No. 113114328 dated Feb. 11, 2025.

*Primary Examiner* — Adolf D Berhane
*Assistant Examiner* — Afework S Demisse
(74) *Attorney, Agent, or Firm* — FOLEY & LARDNER LLP

(57) ABSTRACT

A circuit includes first and second transistors coupled in series, respective gate terminals of which are coupled to a first node to receive a first signal through a first capacitor; third and fourth transistors coupled in series, respective gate terminals of which are coupled to a second node to receive a second signal logically inverse to the first signal through a second capacitor; a fifth transistor having its source/drain terminals coupled between the gate terminal of the first transistor and the first node; a sixth transistor having its source/drain terminals coupled between the first node and the gate terminal of the second transistor; a seventh transistor having its source/drain terminals coupled between the gate terminal of the third transistor and the second node; and an eighth transistor having its source/drain terminals coupled between the second node and the gate terminal of the fourth transistor.

20 Claims, 15 Drawing Sheets

200

(56)       References Cited

U.S. PATENT DOCUMENTS

| | | | |
|---|---|---|---|
| 2012/0250421 A1 * | 10/2012 | Ucciardello | H02M 3/073 |
| | | | 365/185.27 |
| 2012/0274392 A1 | 11/2012 | Webb | |
| 2019/0044438 A1 | 2/2019 | Zou et al. | |
| 2021/0050778 A1 | 2/2021 | Rana | |
| 2022/0116046 A1 | 4/2022 | Chen et al. | |

* cited by examiner

200

200

500

600

Phase 2

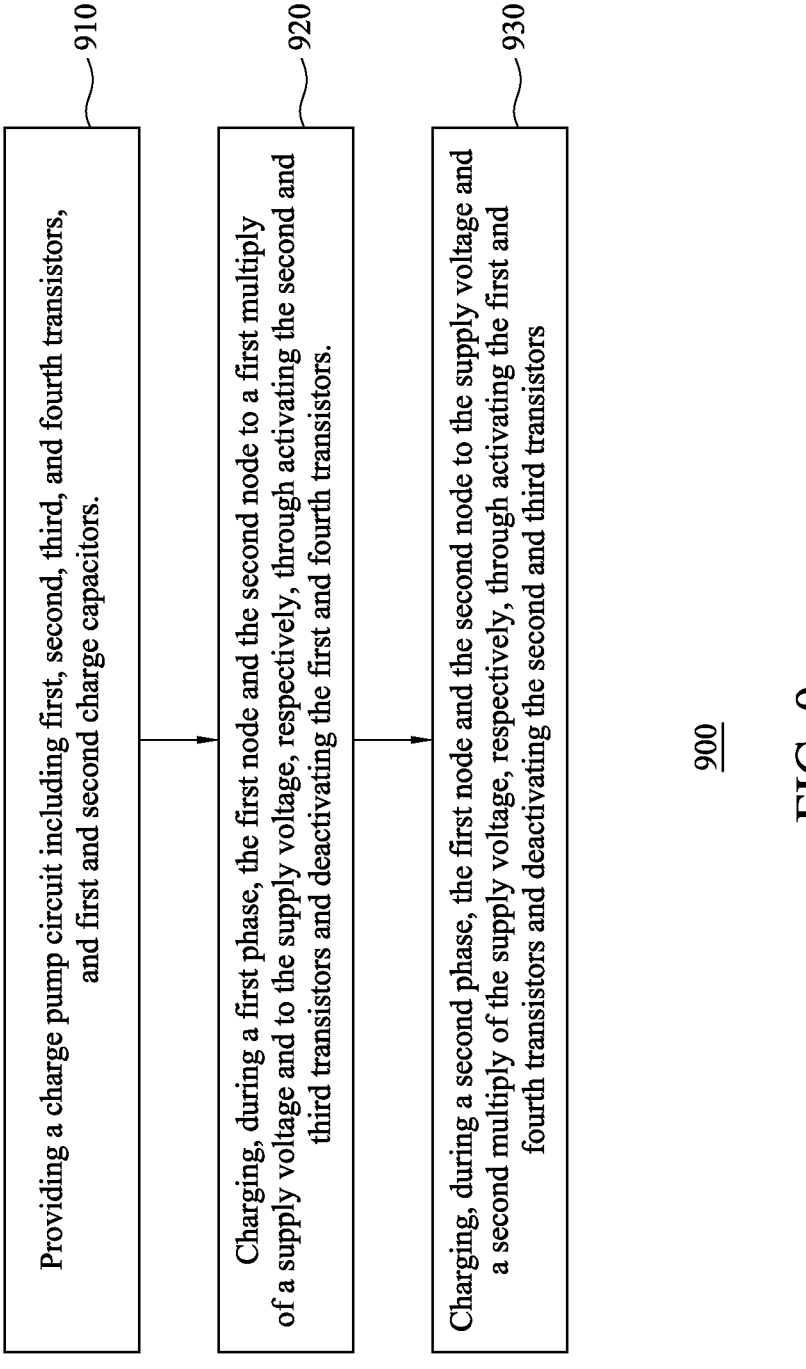

Providing a charge pump circuit including first, second, third, and fourth transistors, and first and second charge capacitors.    910

Charging, during a first phase, the first node and the second node to a first multiply of a supply voltage and to the supply voltage, respectively, through activating the second and third transistors and deactivating the first and fourth transistors.    920

Charging, during a second phase, the first node and the second node to the supply voltage and a second multiply of the supply voltage, respectively, through activating the first and fourth transistors and deactivating the second and third transistors    930

CHARGE PUMP CIRCUITS AND METHODS FOR OPERATING THE SAME

CROSS-REFERENCE TO RELATED APPLICATION

This application claims priority to and the benefit of U.S. Provisional Application No. 63/578,201, filed Aug. 23, 2023, and U.S. Patent App. No. 63/607,870, filed Dec. 8, 2023, each of which are incorporated herein by reference in their entireties for all purposes.

BACKGROUND

The semiconductor integrated circuit (IC) industry has experienced exponential growth. As ICs continue to scale down, more and more devices are integrated into the single chip. This scaling down process generally provides benefits by increasing production efficiency and lowering associated costs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 9 illustrates a flow chart of an example method for operating an example charge pump circuit that can be included in the memory device of FIG. 1, in accordance with some embodiments.

DETAILED DESCRIPTION

Figure 1:
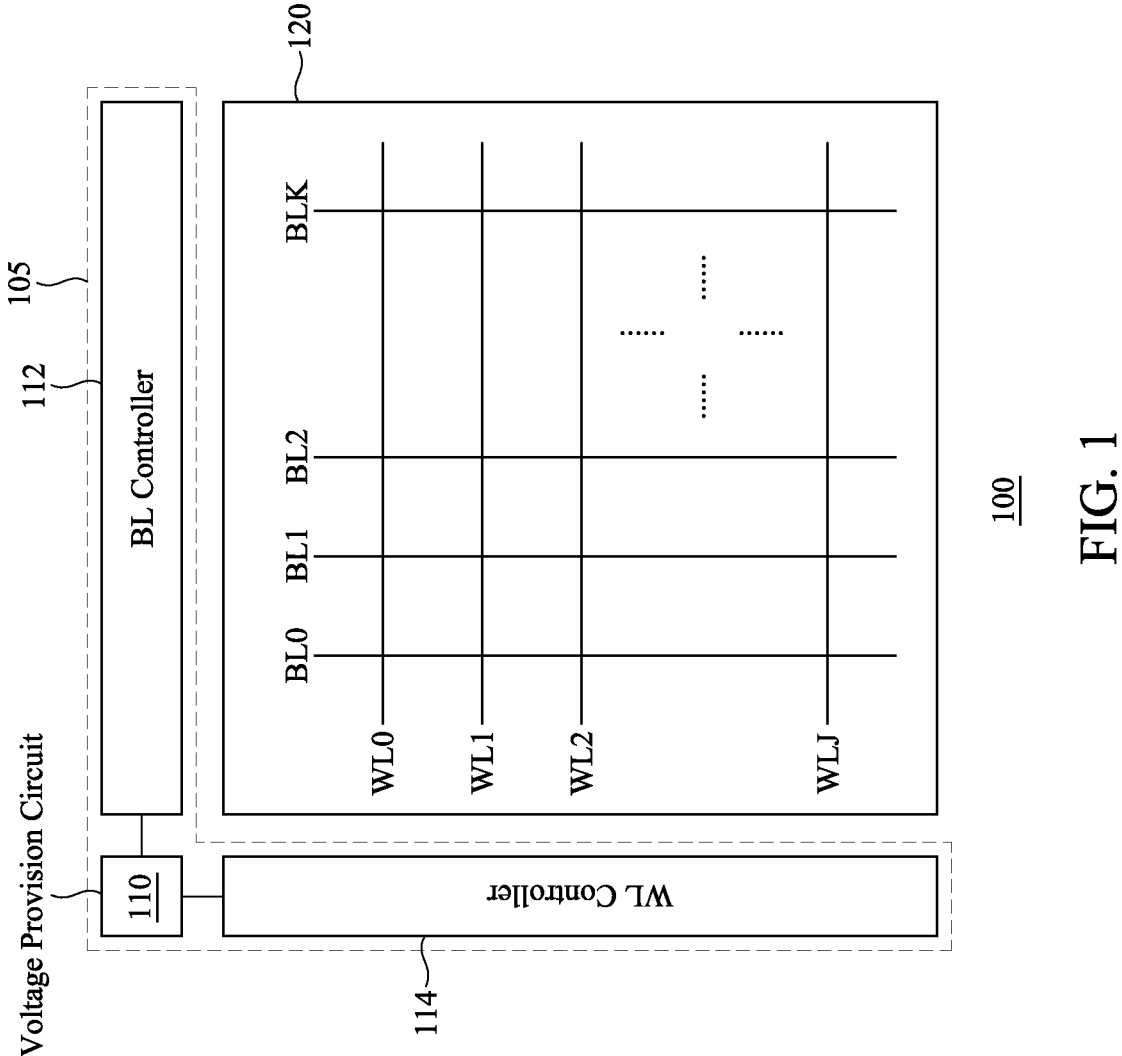
FIG. 1 illustrates a block diagram of an example memory device including a charge pump circuit, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with the scaling down of technology nodes, semiconductor memory devices are becoming more highly integrated and low operating supply voltages are being widely used. However, even memory devices that operate at a low voltage may sometimes need high voltage power supply for certain internal circuits and operations such as driving bit lines and word lines. For such a purpose, a variety of voltage provision circuits for generating high voltage (e.g., a voltage or charge pump circuit) have been developed. In general, a charge pump circuit consists of capacitors and switches. Through controlling on/off of those switches and respective timings to alternately charge and discharge the capacitors, the charge pump circuit can multiply a supply voltage to boost or pump an output voltage to a relatively high level. In addition to the memory devices (or systems), the charge pump circuit has a wide range of applications such as, for example, liquid-crystal display (LCD) drivers, micro electro-mechanical systems (MEMS), power-supply generation, etc.

A charge pump circuit can be operated by controlling capacitors and switches. The switch may sometimes be implemented as a clock-controlled metal-oxide-semiconductor field-effect-transistor (MOSFET). By alternately charging and discharging the capacitors, the charge pump circuit can multiply a supply voltage to boost or pump an output voltage to a relatively high level. However, an output voltage may drop suddenly with a heavy current loading, for example when a coupled memory device needs a higher read or write voltage, requiring a heavy current for parallel read or write. Such a heavy current loading can cause a gate-source voltage difference (Vgs=Vg–Vs) of a supposedly activated NMOS transistor (e.g., one of the switches) and/or a source-gate voltage difference (Vsg=Vs–Vg) of a PMOS transistor (e.g., another of the switches) to shrink signifi-cantly, which can cause such switches to be erroneously turned off. Consequently, the output voltage will drop sud-denly, resulting in ineffective charge pump operation. In this regard, the existing charge pump circuits have not been entirely satisfactory.

The present disclosure provides various embodiments of a charge pump circuit that includes switches, capacitors (sometimes referred to as charge transfer capacitors), assist switches, and assist capacitors (sometimes referred to as gate capacitors). The switches and the capacitors operably coupled to each other can receive an input voltage and provide an output voltage, which may be a pumped output of the input voltage. At least one of the assist switches and at least one of the assist capacitors can be operably coupled to at least one of the switches and at least one of the capacitors to assist providing the output voltage. The assist switch and the assist capacitor coupled to the switch and the capacitor allow the charge pump circuit to sustain a larger current loading. For example, when the switch is a PMOS transistor (and/or an NMOS transistor), the assist switch and the capacitor coupled to the device can keep a gate-source voltage difference, Vsg of the PMOS transistor (and/or Vgs of the NMOS transistor), at a higher voltage, which prevents Vsg (and/or Vgs) from falling below the threshold voltage of the device. This allows the charge pump circuit to sustain a larger current loading and improve a driving capability.

FIG. 1 illustrates a block diagram of an example memory device 100 including a charge pump circuit, in accordance with some embodiments. In one aspect, a memory array 120 includes a plurality of storage circuits or memory cells. The memory array 120 further includes word lines $WL_0$, $WL_1$ . . . . $WL_J$, each extending in a first direction (e.g., X-direction) and bit lines $BL_0$, $BL_1$ . . . . $BL_K$, each extending in a second direction (e.g., Y-direction). The word lines WLs and the bit lines BLs may each be a conductive metal or conductive rail. In some embodiments, each memory cell is coupled to a corresponding word line WL and a corresponding bit line BL, and can be operated according to voltages or currents through the corresponding word line WL and the corresponding bit line BL. In some embodiments, each bit line includes bit lines BL, BLB coupled to one or more memory cells of a group of memory cells disposed along the second direction (e.g., Y-direction). The bit lines BL, BLB may receive and/or provide differ-ential signals.

Each memory cell may include a volatile memory cell, a non-volatile memory cell, or a combination of them. For example, each memory cell is embodied as a static random access memory (SRAM) cell. However, it should be appre-ciated that the memory cell can be implemented as any of various other non-volatile memory cells such as, for example, a resistive random access memory (RRAM) cell, a magnetoresistive random access memory (MRAM) cell, a phase-change random access memory (PCRAM) cell, an eFuse, an anti-fuse, etc., while remaining within the scope of the present disclosure. In some embodiments, the memory array 120 includes additional lines (e.g., select lines, refer-ence lines, reference control lines, power rails, etc.).

The memory controller 105 is a hardware component that controls operations of the memory array 120. In some embodiments, the memory controller 105 includes a bit line (BL) controller 112, a word line (WL) controller 114, and a voltage provision circuit 110. The BL controller 112, the WL controller 114, and the voltage provision circuit 110 may be embodied as logic circuits, analog circuits, or a combination of them. In one configuration, the WL controller 114 is a circuit that provides a voltage or current through one or more word lines WLs of the memory array 120, and the BL controller 112 is a circuit that provides or senses a voltage or current through one or more bit lines BLs of the memory array 120. In one configuration, the voltage provision circuit 110 is a circuit that provides a voltage signal to the BL controller 112 and/or the WL controller 114. The BL con-troller 112 may be coupled to bit lines BLs of the memory array 120, and the WL controller 114 may be coupled to word lines WLs of the memory array 120. In some embodi-ments, the memory controller 105 includes more, fewer, or different components than shown in FIG. 1.

In various embodiments, the voltage provision circuit 110 may include one or more charge pump circuits, each of which is configured to generate a boosted voltage signal to the BL controller 112 and/or the WL controller 114 for desired read/write performance. For example, to write data at a memory cell, the voltage provision circuit 110 can provide a boosted write voltage (or bias) to the WL con-troller 114, causing the boosted write voltage to be sent to the memory cell through a corresponding word line WL. This allows a bit line and/or complementary bit line of the memory cell 125 to discharge faster. Therefore, the required $VCC_{min}$ (minimum operating voltage) of the memory cell (and the memory array 120 as a whole) at a particular write speed can be lowered when the voltage on the word line is boosted. In another example, during a read operation of the memory cell, the voltage on the word line can be boosted to more than the $VCC_{min}$, which allows the voltage present on the bit line to discharge faster. Accordingly, a read speed of the memory cell (and the memory array 120 as a whole) can be increased.

Figure 2:
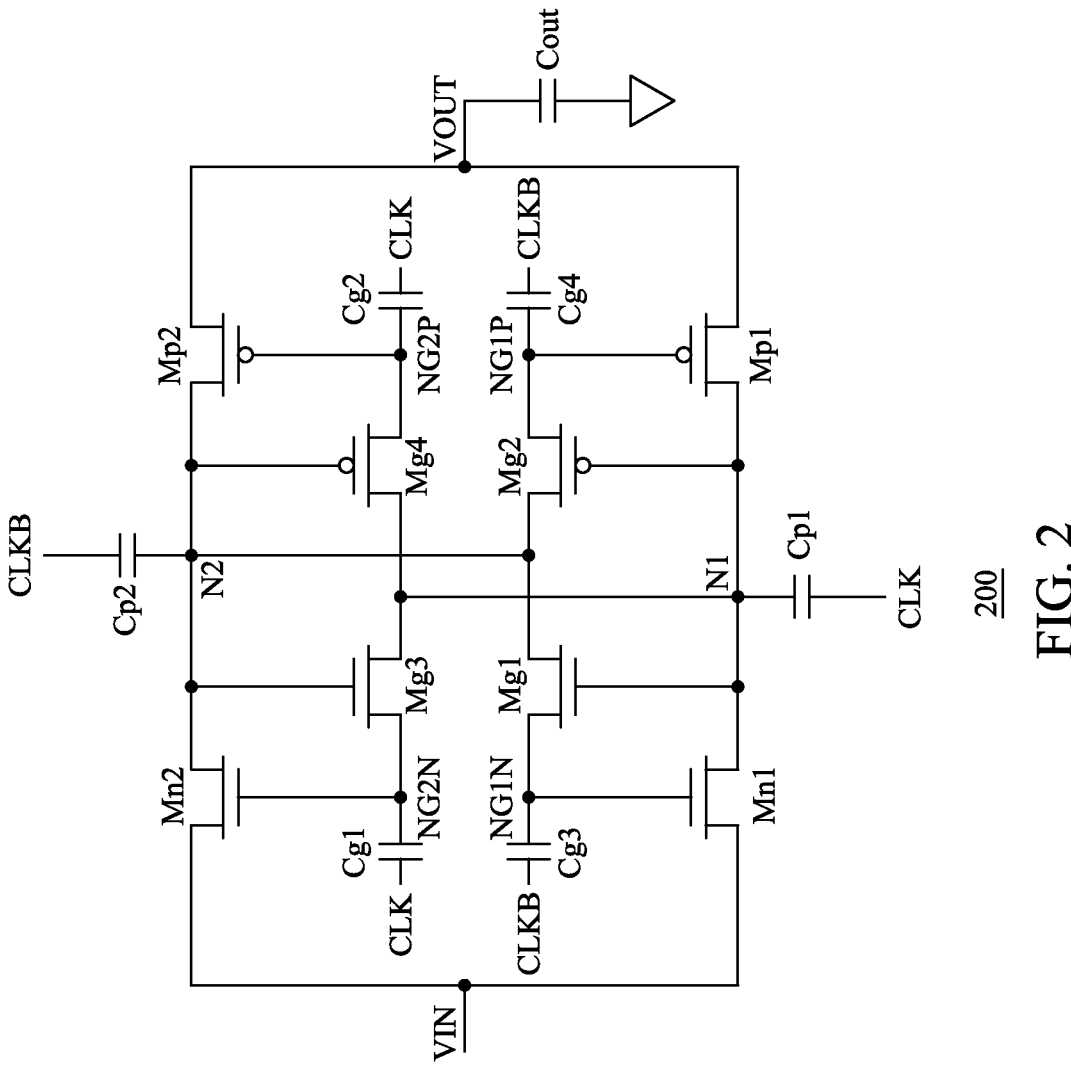
FIG. 2 illustrates a schematic diagram of an example charge pump circuit that can be included in the memory device of FIG. 1, in accordance with some embodiments.

FIG. 2 illustrates a schematic diagram of an example charge pump circuit 200 that can be included in the memory device of FIG. 1, in accordance with some embodiments. For example, the charge pump circuit 200 may be a part of the voltage provision circuit 110. It should be appreciated that the schematic diagram of FIG. 2 is simplified for illustrative purposes, and thus, the charge pump circuit 200 can be implemented as any of various other configurations (as long as it can boost an input voltage to a higher voltage level through a capacitor) while remaining within the scope of the present disclosure.

As shown, the charge pump circuit 200 includes transis-tors Mn1, Mn2, Mp1, and Mp2, assist transistors Mg1, Mg2, Mg3, and Mg4; charge transfer capacitors Cp1 and Cp2; and assist capacitors Cg1, Cg2, Cg3, and Cg4. The transistor Mn2 and the transistor Mp2 are connected to each other in series between an input node configured to receive VIN and an output node configured to provide VOUT, wherein respective gate terminals of the transistor Mn2 and transistor Mp2 are coupled to a node N1 configured to receive a clock signal CLK through the charge capacitor Cp1. The transistor Mn1 and the transistor Mp1 are connected to each other in series between the input node and the output node, wherein respective gate terminals of the transistor Mn1 and the transistor Mp1 are connected to a node N2 configured to receive a clock signal CLKB that is logically inverse to the clock signal CLK through the charge capacitor Cp2.

In general, the charge pump circuit 200 can receive VIN (e.g., VDD or VDDIO) at the input node and output a multiply of VIN at the output node as VOUT. As a brief overview, the charge pump circuit 200 can provide VOUT as a multiply of VIN during each of a first phase and a second phase. The first phase and second phase can correspond to the CLKB signal and the CLK signal being asserted (e.g., pulled up), respectively. For example, during the first phase, the CLKB signal is pulled up (e.g., to VDDIO) while the CLK signal is pulled down (e.g., to ground or 0V), which activates the transistors Mn1 and Mp2 and deactivates the transistors Mn2 and Mp1; and during the second phase, the CLKB signal is pulled down (e.g., to ground or 0V) while the CLK signal is pulled up (e.g., to VDDIO), which activates the transistors Mn2 and Mp1 and deactivates the transistors Mn1 and Mp2. Accordingly, during the first phase, a voltage at the node N2 can be pumped to a higher voltage (e.g., 2×VDDIO) through the charge capacitor Cp2, and the charge at the node N2 can be shared to the output node through the activated transistor Mp2, which causes VOUT to be equal to the pumped voltage. Similarly, during the second phase, a voltage at the node N1 can be pumped to a higher voltage (e.g., 2×VDDIO) through the charge capacitor Cp1, and the charge at the node N1 can be shared to the output node through the activated transistor Mp1, which causes VOUT to be equal to the pumped voltage. Further, by including the assist transistors Mg1 to Mg4, each of which is coupled to the gate terminal and source terminal of a corresponding one of the transistors Mn1, Mp1, Mn2, and Mp2, the nodes N2 and N1 can be isolated from the gate terminals of the activated transistors Mn1, Mp1, Mn2, and Mp2 during each phase. As such, even though a large loading occurs to the charge pump circuit 200 (causing a sudden voltage to drop on either the node N1 or N2), these activated transistors will not be easily deactivated. Detailed operation of the charge pump circuit will be provided below.

In some embodiments, the charge capacitor Cp1 includes a first terminal and a second terminal coupled to the clock signal CLK and the node N1, respectively, and the node N1 is coupled between the transistor Mn1 and the transistor Mp1. Likewise, the charge capacitor Cp2 includes a first terminal and a second terminal coupled to the clock signal CLKB and the node N2, respectively, and the node N2 is coupled between the transistor Mn2 and the transistor Mp2.

The assist transistor Mg3 has its source/drain terminals connected to the gate terminal of the transistor Mn2 and the node N1, respectively. The assist transistor Mg4 has its source/drain terminals connected to the node N1 and the gate terminal of the transistor Mp2, respectively. The assist transistor Mg1 has its source/drain terminals connected to the gate terminal of the transistor Mn1 and the node N2, respectively. The assist transistor Mg2 has its source/drain terminals connected to the node N2 and the gate terminal of the transistor Mp1, respectively. More specifically, the assist transistor Mg4 includes a gate terminal, a source terminal, and a drain terminal that are connected to the node N1, the gate terminal of the transistor Mp2, and the node N2, respectively. The assist transistor Mg2 includes a gate terminal, a source terminal, and a drain terminal that are connected to the node N2, the gate terminal of the transistor Mp1, and the node N1, respectively.

The assist transistor Mg3 includes a gate terminal, a source terminal, and a drain terminal that are connected to the node N2, the gate terminal of the transistor Mn2, and the node N1, respectively. The assist transistor Mg1 includes a gate terminal, a source terminal, and a drain terminal that are connected to the node N1, the gate terminal of the transistor Mn1, and the node N2, respectively.

The input node, connected to the source/drain terminals of the transistors Mn2 and Mn1, is configured to receive an input voltage VIN (or a first reference voltage). The output node, connected to the source/drain terminals of the transistors Mp2 and Mp1, is configured to provide an output voltage VOUT. In some embodiments, the output node may be connected to a capacitor Cout. In some embodiments, the input node and the output node may be connected to ground through capacitors Cin and Cout, respectively.

As shown, the assist capacitor Cg1 is configured to couple the clock signal CLK to the gate terminal of the transistor Mn2. The assist capacitor Cg2 is configured to couple the clock signal CLK to the gate terminal of the transistor Mp2. The assist capacitor Cg3 is configured to couple the clock signal CLKB to the gate terminal of the transistor Mn1. The assist capacitor Cg4 is configured to couple the clock signal CLKB to the gate terminal of the transistor Mp1.

The assist capacitors Cg1, Cg2, Cg3, and Cg4 have a first size and the charge capacitors Cp1 and Cp2 have a second size. In some embodiments, the first size is smaller than the second size. The assist transistors Mg1, Mg2, Mg3, and Mg4 have a first size and the transistors Mn1, Mn2, Mp1, and Mp2 have a second size. In some embodiments, the first size is smaller than the second size.

In some embodiments, the transistors Mn1, Mn2, Mg1, and Mg3 have a first conductive type, and the transistors Mp1, Mp2, Mg2, and Mg4 have a second conductive type different from the first conductive type. For example, the first conductive type is n-type, and the second conductive type is p-type. For example, the first conductive type is p-type, and the second conductive type is n-type.

Figure 3A:
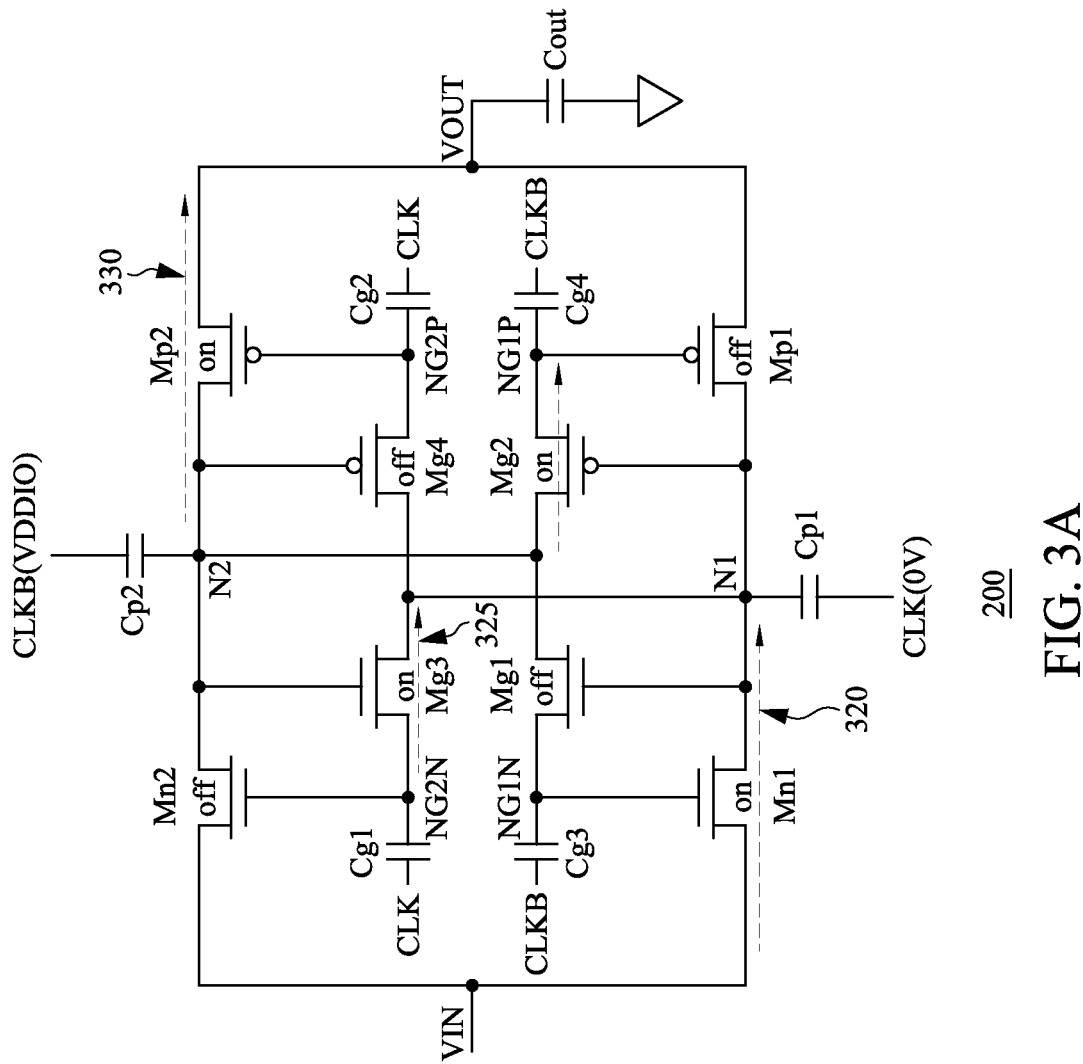
FIG. 3A illustrates a schematic diagram of an example charge pump circuit that can be included in the memory device of FIG. 1, in accordance with some embodiments.
Figure 3B:
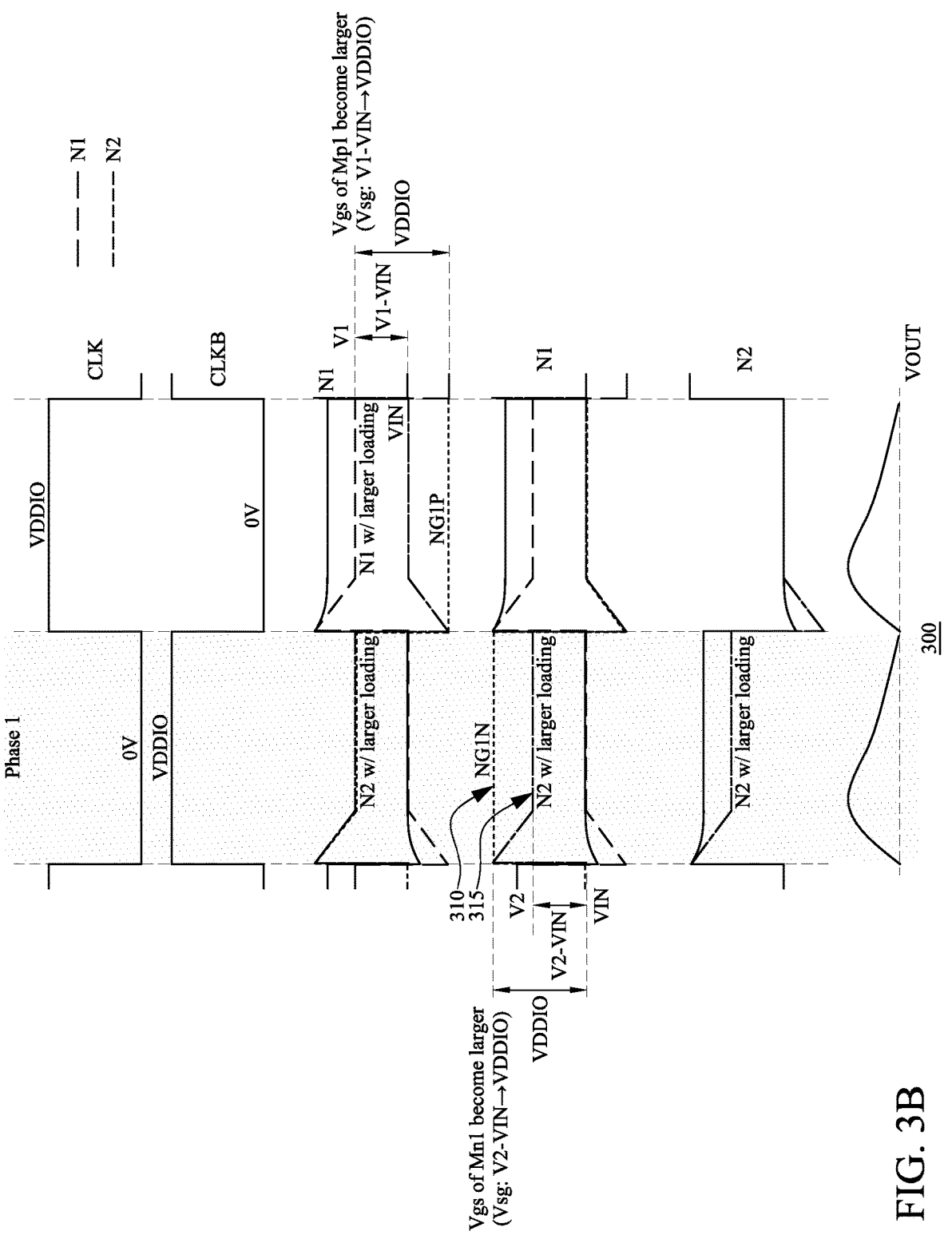
FIG. 3B illustrates an example waveform associated with the charge pump circuit of FIG. 3A, in accordance with some embodiments.

FIG. 3A illustrates a schematic diagram of the example charge pump circuit 200 that can be included in the memory device of FIG. 1, in accordance with some embodiments. More specifically, shown in FIG. 3A may be the charge pump circuit 200 in a first phase. FIG. 3B illustrates an example waveform 300 associated with the charge pump circuit 200 of FIG. 3A, in accordance with some embodiments.

In the first phase, the transistors Mn2, Mp1, Mg4, and Mg1 are turned off, and the transistors Mp2, Mn1, Mg3, and Mg2 are turned on, thereby isolating the gate terminal of the transistor Mn1 from the node N2. In the first phase, the clock signal CLK is provided at a first logic state. For example, as shown in FIG. 3B, the clock signal CLK of the first phase may be at "logic low" (e.g., 0 V). In the first phase, the clock signal CLKB is provided at a second logic state. For example, as shown in FIG. 3B, the clock signal CLKB of the first phase may be at "logic high" (e.g., VDDIO). The clock signal CLK and the clock signal CLKB can be logically inverse to each other. For example, as shown in FIG. 3B and discussed below, in a second phase, the clock signal CLK is provided at the second logic state (e.g., "logic high," VDDIO, etc.) and the clock signal CLKB is provided at the first logic state (e.g., "logic low," 0 V, etc.).

In the first phase, a current 320 flowing through the transistor Mn1 and a current 325 flowing through the assist transistor Mg3 can charge the charge transfer capacitor Cp1. Likewise, the charge transfer capacitor Cp2 may contain charges (e.g., the charge transfer capacitor Cp2 has been charged in the previous second phase, as discussed with respect to FIG. 4A and FIG. 4B). The charge pump circuit 200, with the charge transfer capacitor Cp2 that has been charged, can output a current 330 through the transistor Mp2 and the output node. Since the voltage across a capacitor cannot immediately change, the charge transfer capacitor Cp2 can maintain at a voltage of the first phase (e.g., VDDIO). To maintain this voltage across itself, the charge transfer capacitor Cp1 forces the voltage VOUT at the output node to be equal to 2×(the voltage of the first phase (e.g., VDDIO)), making the equivalent voltage across the capacitor Cp2 equal to the voltage of the first phase (e.g., VDDIO). This allows a first voltage (e.g., VIN) at the input node to be pumped to a second voltage (e.g., VOUT) at the output node. For example, the second voltage (e.g., VOUT) can be a multiply of the first voltage (e.g., VIN). For example, VOUT=2×VIN.

Figure 5:
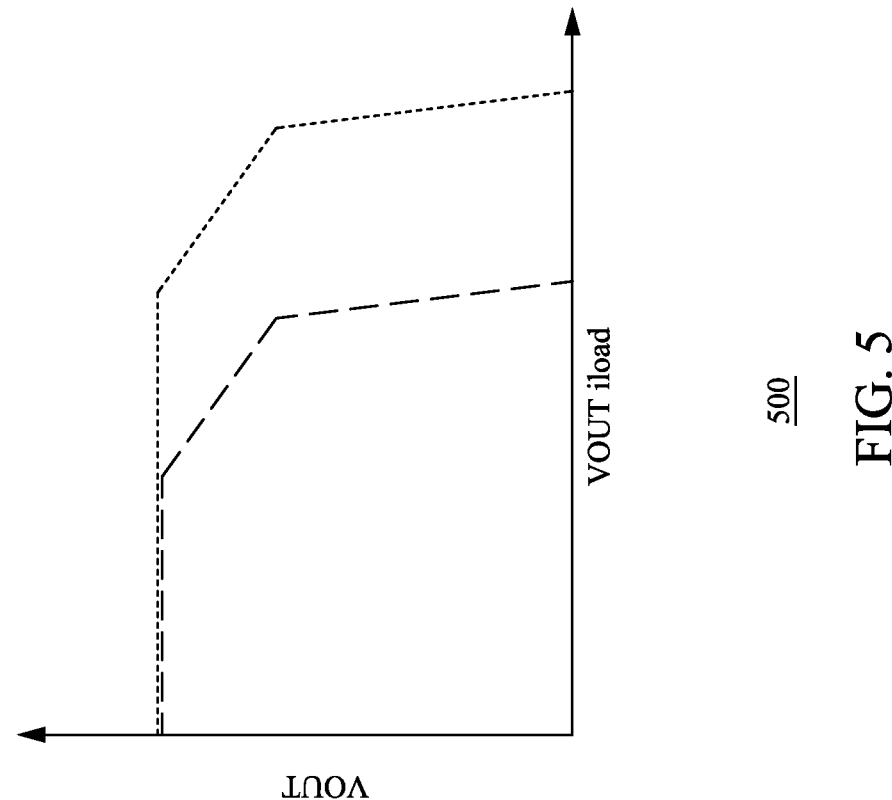
FIG. 5 illustrates an example voltage plot associated with an example charge pump circuit that can be included in the memory device of FIG. 1, in accordance with some embodiments.

In the first phase, the assist transistor Mg1 being turned off can separate the node NG1N from the node N2, thereby keeping the node NG1N at a higher voltage than the node N2. For example, as shown in FIG. 3B, the voltage 310 of the node NG1N can be kept at a higher voltage than a voltage 315 of the node N2. This allows a voltage difference across the gate terminal and the source terminal of the transistor Mn1 to remain larger than a threshold voltage of the transistor Mn1. The higher voltage difference across the gate terminal and the source terminal of the transistor Mn1 allows for the charge pump circuit 200 to sustain a larger current loading, as shown in FIG. 5.

Likewise, the assist transistor Mg4 being turned off can separate the node NG2P from the node N1, thereby keeping the node NG2P at a higher voltage than the node N1. This allows a voltage difference across the gate terminal and the source terminal of the transistor Mp2 to remain larger than a threshold voltage of the transistor Mp2. The higher voltage difference across the gate terminal and the source terminal of the transistor Mp2 allows for the charge pump circuit 200 to sustain a larger current loading, as shown in FIG. 5.

Figure 4A:
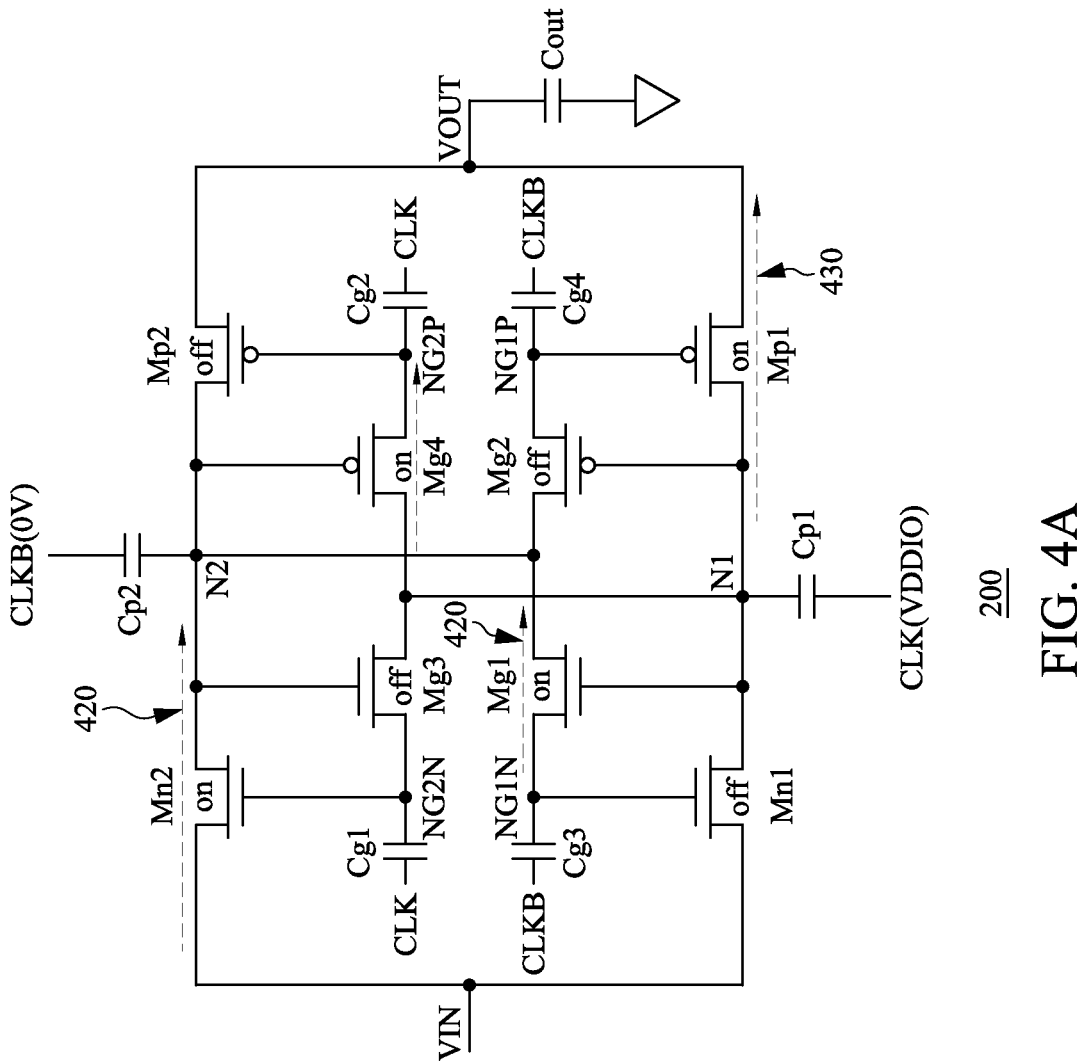
FIG. 4A illustrates a schematic diagram of an example charge pump circuit that can be included in the memory device of FIG. 1, in accordance with some embodiments.
Figure 4B:
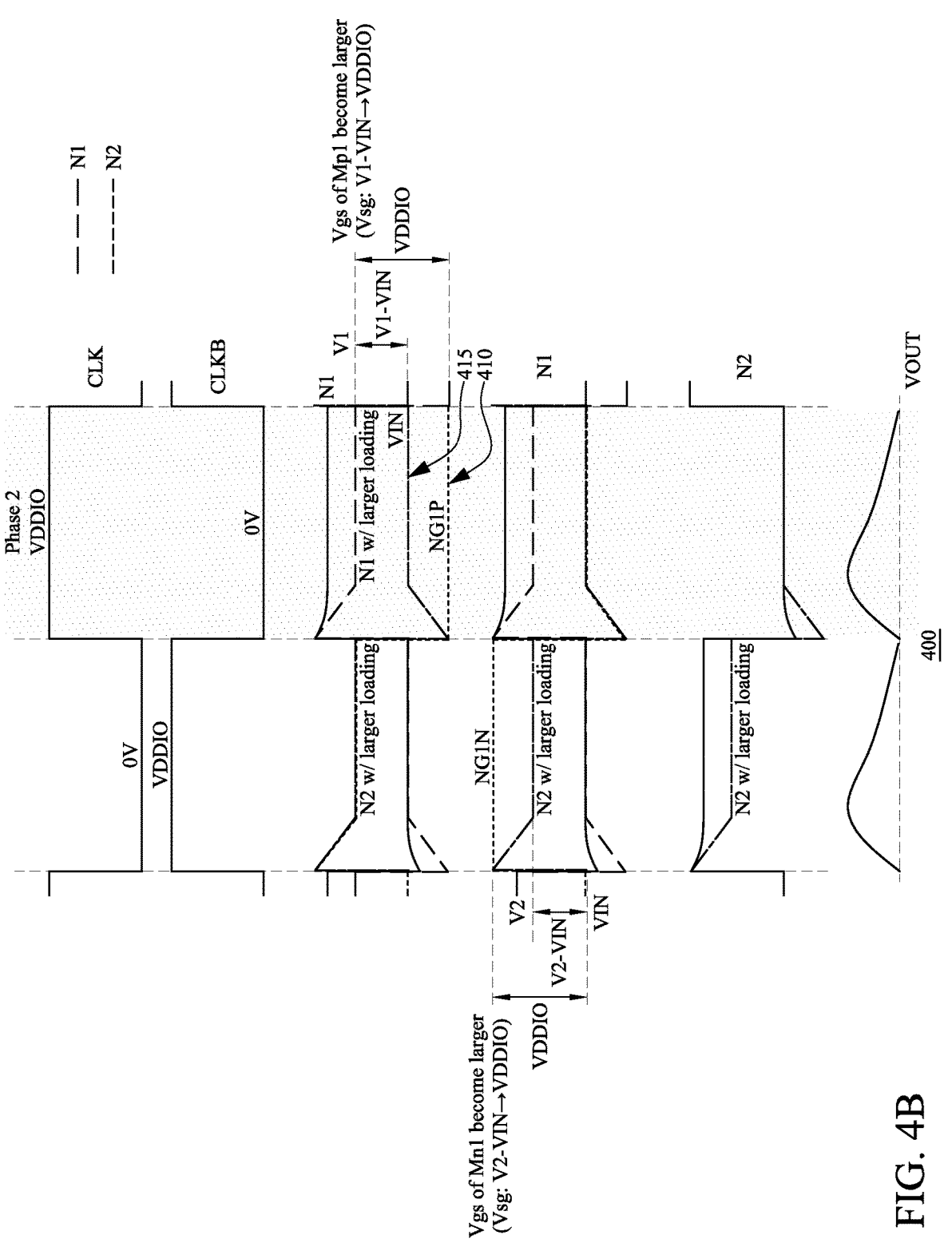
FIG. 4B illustrates an example waveform associated with the charge pump circuit of FIG. 4A, in accordance with some embodiments.

FIG. 4A illustrates a schematic diagram of the example charge pump circuit 200 that can be included in the memory device of FIG. 1, in accordance with some embodiments. More specifically, shown in FIG. 4A may be the charge pump circuit 200 in a second phase. FIG. 4B illustrates an example waveform 400 associated with the charge pump circuit 200 of FIG. 4A, in accordance with some embodiments.

In the second phase, the transistors Mn2, Mp1, Mg4, and Mg1 are turned on, and the transistors Mp2, Mn1, Mg3, and Mg2 are turned off, thereby isolating the gate terminal of the transistor Mp1 from the node N2. In the second phase, the clock signal CLKB is provided at the first logic state. For example, as shown in FIG. 4B, the clock signal CLKB of the second phase may be at "logic low" (e.g., 0 V). In the second phase, the clock signal CLK is provided at the second logic state. For example, as shown in FIG. 4B, the clock signal CLK of the second phase may be at "logic high" (e.g., VDDIO). The clock signal CLKB and the clock signal CLK can be logically inverse to each other. For example, as described with respect to FIG. 3B, in the first phase, the clock signal CLKB is provided at the first logic state (e.g., "logic high," VDDIO, etc.) and the clock signal CLK is provided at the second logic state (e.g., "logic low," 0 V, etc.).

In the second phase, a current 420 flowing through the transistor Mn2 and a current 425 flowing through the assist transistor Mg1 can charge the charge transfer capacitor Cp2. As discussed with respect to FIG. 3A and FIG. 3B, the charge transfer capacitor Cp2 charged in the second phase can be used to pump the input voltage VIN to the output voltage VOUT in the first phase. Likewise, the charge pump circuit 200, with the charge transfer capacitor Cp1 that has been charged in the first phase, can output a current 430 through the transistor Mp1 and the output node. Since the voltage across a capacitor cannot immediately change, the charge transfer capacitor Cp1 can maintain at a voltage of the second phase (e.g., VDDIO). To maintain this voltage across itself, the charge transfer capacitor Cp1 forces the voltage VOUT at the output node to be equal to 2×(the voltage of the second phase (e.g., VDDIO)), making the equivalent voltage across the capacitor Cp1 equal to the voltage of the second phase (e.g., VDDIO). This allows a first voltage (e.g., VIN) at the input node to be pumped to a second voltage (e.g., VOUT) at the output node. For example, the second voltage (e.g., VOUT) can be a multiply of the first voltage (e.g., VIN). For example, VOUT=2×VIN.

In the second phase, the transistor Mg2 being turned off can separate the node NG1P from the node N2, thereby keeping the node NG1P at a lower voltage than the node N2. For example, as shown in FIG. 4B, the voltage 410 of the node NG1P can be kept at a lower voltage than a voltage 415 of the node N2. This allows a voltage difference across the gate terminal and the source terminal of the transistor Mp1 to remain larger than a threshold voltage of the transistor Mp1. The higher voltage difference across the gate terminal and the source terminal of the transistor Mp1 allows for the charge pump circuit 200 to sustain a larger current loading, as shown in FIG. 5.

Likewise, the assist transistor Mg3 being turned off can separate the node NG2N from the node N1, thereby keeping the node NG2N at a lower voltage than the node N1. This allows a voltage difference across the gate terminal and the source terminal of the transistor Mn2 to remain larger than a threshold voltage of the transistor Mn2. The higher voltage difference across the gate terminal and the source terminal of the transistor Mn2 allows for the charge pump circuit 200 to sustain a larger current loading.

The transistors Mn2, Mp1, Mg4, and Mg1 can be configured to be activated alternately (e.g., operate in the first phase and the second phase alternately) with respect to the transistors Mn1, Mp2, Mg3, and Mg2 so as to boost an output voltage (e.g., VOUT) as a multiply of an input voltage (e.g., VIN). For example, the alternating clock signals CLK and CLKB, which are inverse to each other, can be provided to configure the charge pump circuit 200 to operate in the first phase and the second phase.

In some embodiments, the voltage difference across the gate terminal and the source terminal of the transistor Mn1 is larger than the voltage difference across the gate terminal and the source terminal of the transistor Mp1. In some embodiments, the voltage difference across the gate terminal and the source terminal of the transistor Mn1 is larger than the threshold voltage of the transistor Mp1.

FIG. 5 illustrates an example voltage plot 500 associated with an example charge pump circuit that can be included in the memory device of FIG. 1, in accordance with some embodiments. The voltage plot 500 shows a voltage output (e.g., VOUT) at an output node versus a current loading at the output node. For example, the voltage plot 500 may be a voltage output (e.g., VOUT) at the output node of the charge pump circuit 200 with respect to a current loading.

As discussed with respect to FIG. 2 to FIG. 4A-4B, the operation of assist transistors Mg1, Mg2, Mg3, and Mg4 and assist capacitors Cg1, Cg2, Cg3, and Cg4 can be operably coupled to assist the transistors Mn1, Mn2, Mp1, Mp2 and the capacitors Cp1 and Cp2. By operating the assist transistors and the assist capacitors, Vgs of the NMOS (e.g., the transistor Mn1 in FIG. 2) and Vsg of the PMOS (e.g., the transistor Mp1 in FIG. 2) can be kept at a higher voltage (e.g., compared with the threshold voltage of the corresponding MOS device). The higher Vgs (or Vsg) enables the charge pump circuit to operate without turning off the MOS device at a lower current loading (e.g., the dashed line in FIG. 5). This allows the charge pump circuit to sustain a larger current loading (e.g., the dotted line in FIG. 5), thereby improving a driving capability of the charge pump circuit.

Figure 6A:
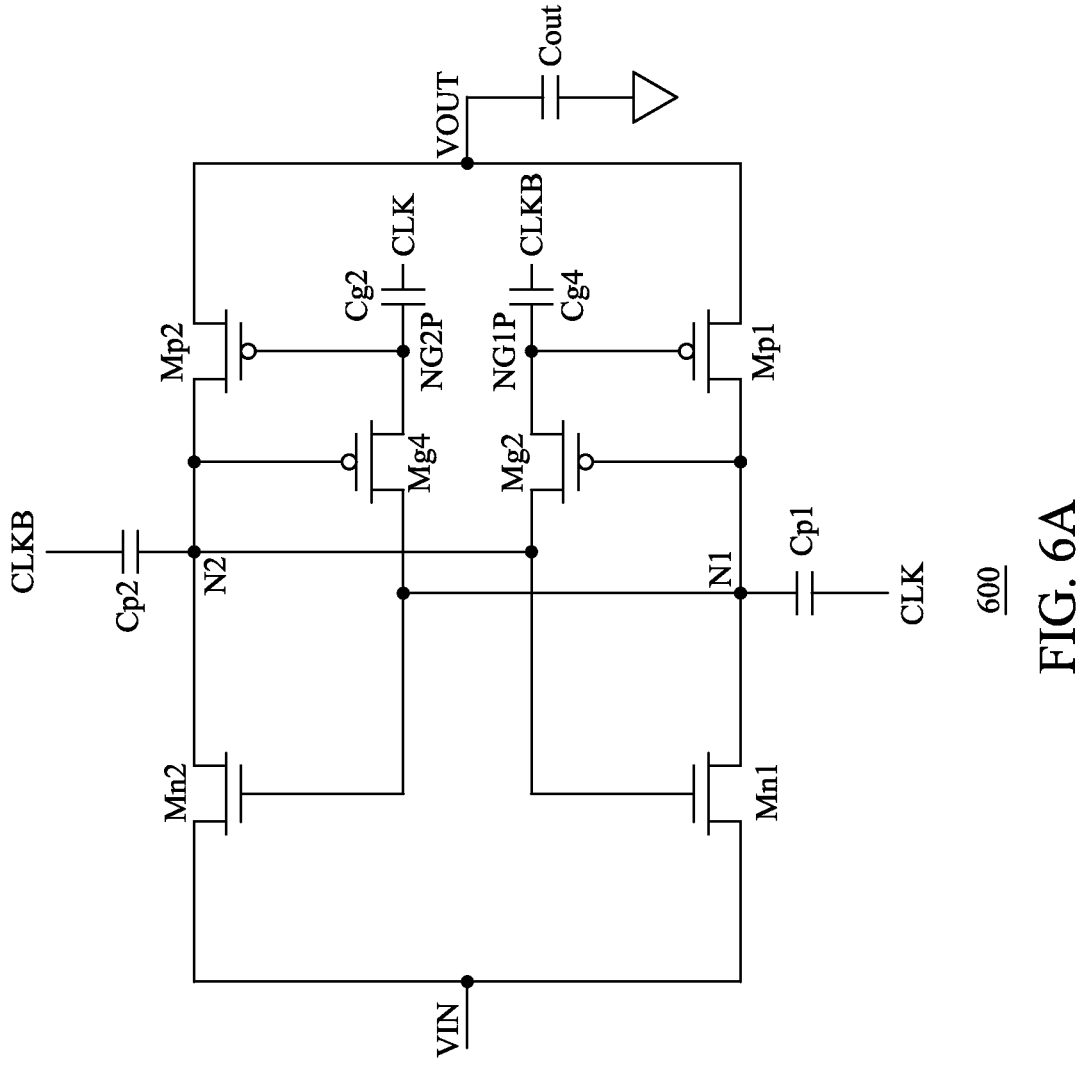
FIG. 6A illustrates a schematic diagram of an example charge pump circuit that can be included in the memory device of FIG. 1, in accordance with some embodiments.
Figure 6B:
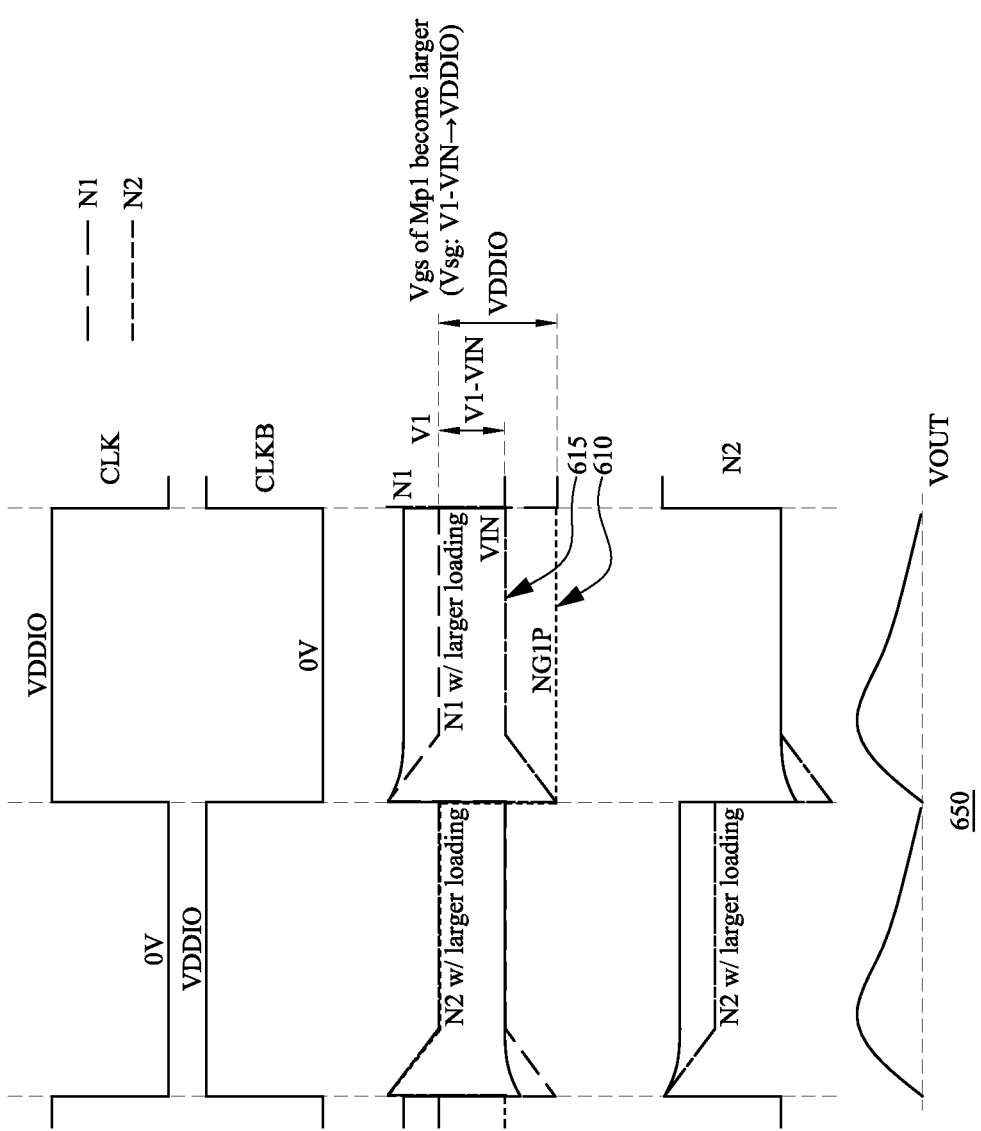
FIG. 6B illustrates an example waveform associated with the charge pump circuit of FIG. 6A, in accordance with some embodiments.

FIG. 6A illustrates a schematic diagram of an example charge pump circuit 600 that can be included in the memory device of FIG. 1, in accordance with some embodiments. For example, the charge pump circuit 600 may be a part of the voltage provision circuit 110. FIG. 6B illustrates an example waveform associated with the charge pump circuit 600 of FIG. 6A, in accordance with some embodiments.

The charge pump circuit 600 may be substantially similar to and/or incorporate features of the charge pump circuit 200, without one or more assist transistors (e.g., the transistors Mg1, and Mg3) and one or more assist capacitors (Cg1 and Cg3). That is, the charge pump circuit 600 can include the assist transistors Mg2 and Mg4 and the assist capacitors Cg2 and Cg4 only at one side of the charge pump circuit 600. For example, as shown in FIG. 6A, the charge pump circuit 600 includes the assist transistors Mg2 and Mg4 and the assist capacitors Cg2 and Cg4 only at a p-type side of the charge pump circuit 600, in which the transistors Mp1, Mp2, Mg2, and Mg4 can be PMOS devices. In this case, in a first phase, the assist transistor Mg2 being turned off can separate the node NG1P from the node N2, thereby keeping the node NG1P at a lower voltage than the node N2. For example, as shown in FIG. 6B, the voltage 610 of the node NG1P can be kept at a lower voltage than a voltage 615 of the node N2. In a second phase, the assist transistor Mg4 being turned off can separate the node NG2P from the node N1. The transistors Mp1 and Mg4 can be configured to be activated alternately (e.g., operate in the first phase and the second phase alternately) with respect to the transistors Mp2 and Mg2 so as to boost an output voltage (e.g., VOUT) as a multiply of an input voltage (e.g., VIN). For example, the alternating clock signals CLK and CLKB, which are inverse to each other, can be provided to configure the charge pump circuit 600 to operate in the first phase and the second phase.

In some embodiments, although not depicted in FIG. 6A and FIG. 6B, the charge pump circuit 600 can include the assist transistors Mg1 and Mg3 and the assist capacitors Cg1 and Cg3 only at an n-type side of the charge pump circuit 600, in which the transistors Mn1, Mn2, Mg1, and Mg3 can be NMOS devices.

Figure 7A:
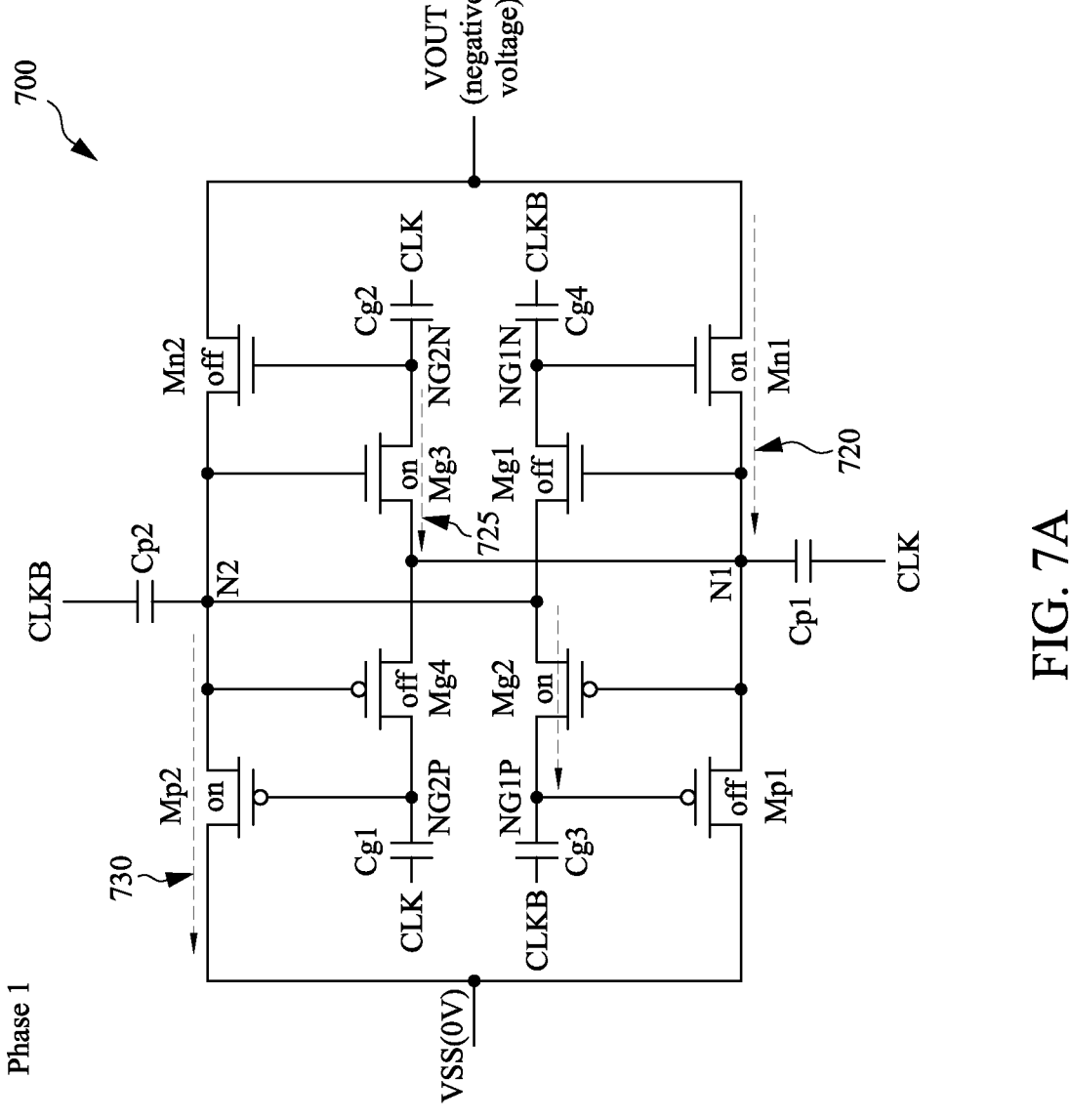
FIG. 7A and FIG. 7B illustrate a schematic diagram of an example charge pump circuit that can be included in the memory device of FIG. 1, in accordance with some embodiments.
Figure 7B:
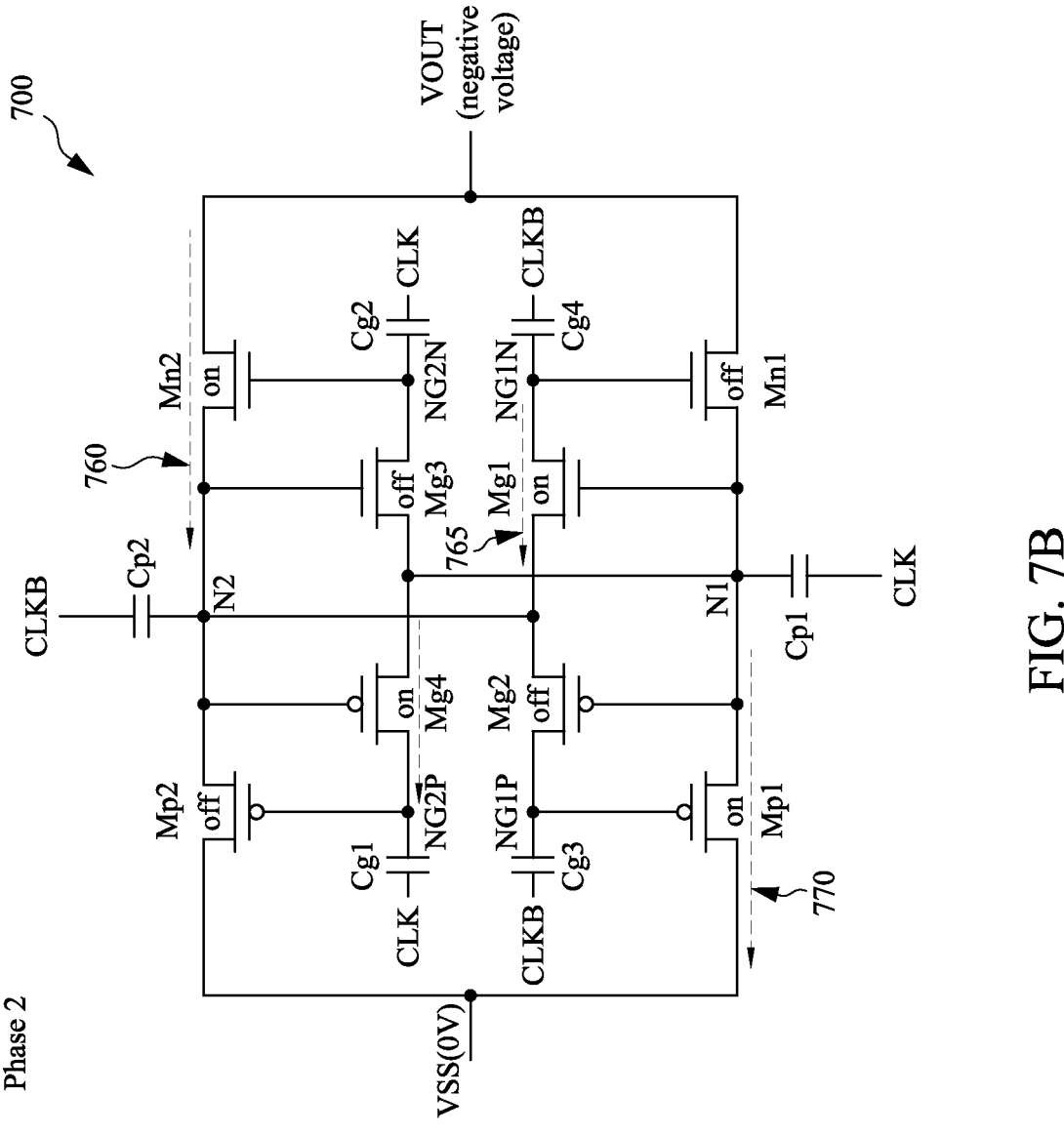
Figure 7C:
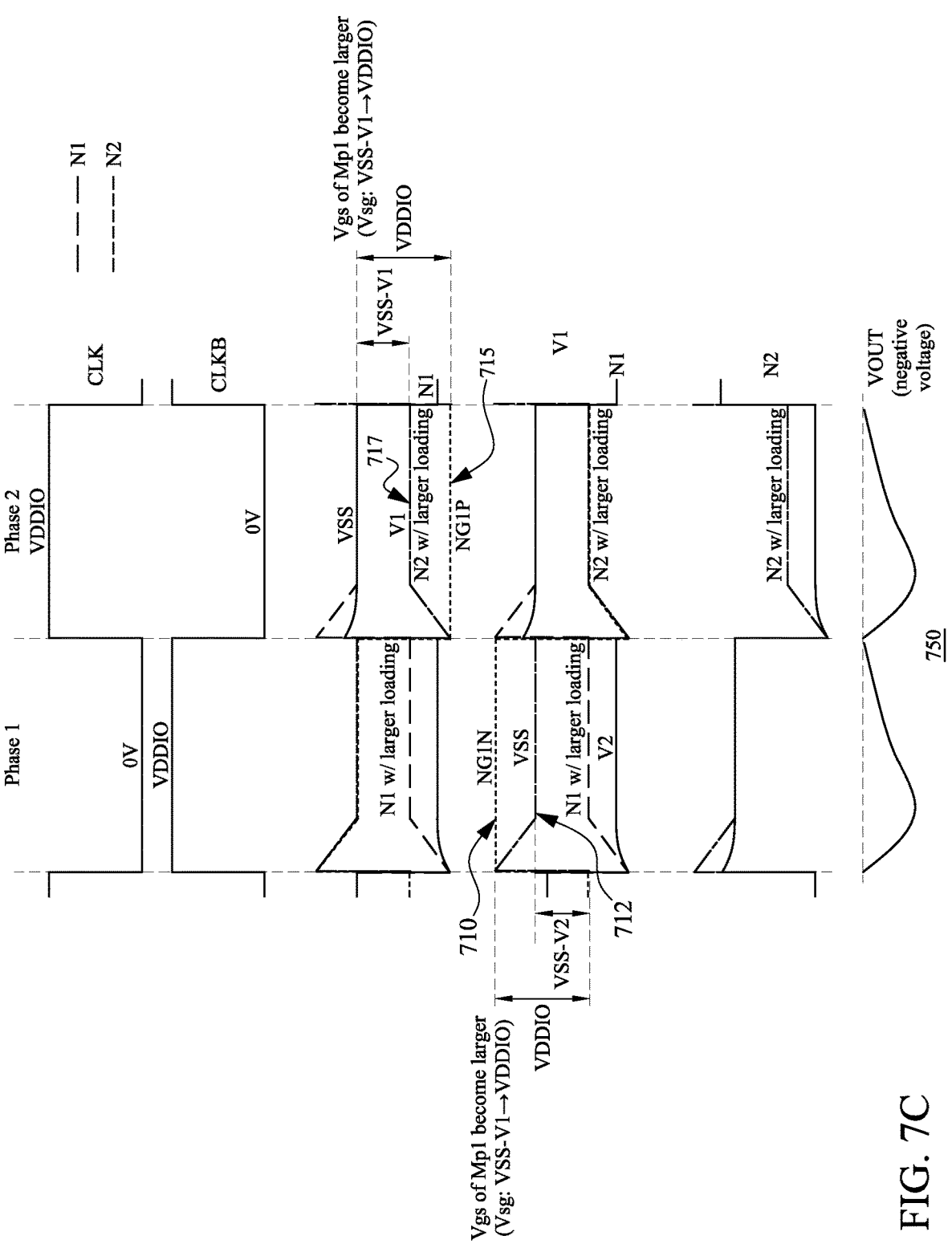
FIG. 7C illustrates an example waveform associated with the charge pump circuit of FIG. 7A and FIG. 7B, in accordance with some embodiments.

FIG. 7A and FIG. 7B illustrate a schematic diagram of an example charge pump circuit 700 that can be included in the memory device of FIG. 1, in accordance with some embodiments. For example, the charge pump circuit 700 may be a part of the voltage provision circuit 110. More specifically, FIG. 7A shows the example charge pump circuit 700 in a first phase, and FIG. 7B shows the same in a second phase. FIG. 7C illustrates an example waveform associated with the charge pump circuit 700 of FIG. 7A and FIG. 7B, in accordance with some embodiments.

The charge pump circuit 700 may be similar to and/or incorporate features of the charge pump circuit 200 shown in FIG. 2. The charge pump circuit 700 may be the charge pump circuit 200 with outputting a negative voltage lower than an input voltage. Like the charge pump circuit 200, the charge pump circuit 700 includes transistors Mn1, Mn2, Mp1, and Mp2, assist transistors Mg1, Mg2, Mg3, and Mg4; charge transfer capacitors Cp1 and Cp2; and assist capacitors Cg1, Cg2, Cg3, and Cg4, as shown in FIG. 7A and FIG. 7B.

Referring to FIG. 7A, in the first phase, the transistors Mn2, Mp1, Mg4, and Mg1 are turned off, and the transistors Mp2, Mn1, Mg3, and Mg2 are turned on, thereby isolating the gate terminal of the transistor Mn1 from the node N2. In the first phase, the clock signal CLK is provided at a first logic state. For example, as shown in FIG. 7C, the clock signal CLK of the first phase may be at "logic low" (e.g., 0 V). In the first phase, the clock signal CLKB is provided at a second logic state. For example, as shown in FIG. 7C, the clock signal CLKB of the first phase may be at "logic high" (e.g., VDDIO). The clock signal CLK and the clock signal CLKB can be logically inverse to each other. For example, as shown in FIG. 7B and discussed below, in a second phase, the clock signal CLK is provided at the second logic state (e.g., "logic high," VDDIO, etc.) and the clock signal CLKB is provided at the first logic state (e.g., "logic low," 0 V, etc.).

In the first phase, a current 720 flowing through the transistor Mn1 and a current 725 flowing through the assist transistor Mg3 can charge the charge transfer capacitor Cp1. Likewise, the charge transfer capacitor Cp2 may contain charges (e.g., the charge transfer capacitor Cp2 has been charged in the previous second phase, as discussed with respect to FIG. 7B). The charge pump circuit 700, with the charge transfer capacitor Cp2 that has been charged, can output a current 730 through the transistor Mp2 and the input node (that is, a negative voltage at the output node). For example, the charge pump circuit 700 can pump a first voltage (e.g., VSS) at the input node into a second voltage (e.g., VOUT) at the output node, the second voltage being a negative voltage lower than the first voltage. For example, the second voltage (e.g., VOUT<0) can be a multiply of the first voltage (e.g., VSS<0). For example, VOUT=2×VSS.

In the first phase, the assist transistor Mg1 being turned off can separate the node NG1N from the node N2, thereby keeping the node NG1N at a higher voltage than the node N2. For example, as shown in FIG. 7C, the voltage 710 of the node NG1N can be kept at a higher voltage than a voltage 712 of the node N2. This allows a voltage difference across the gate terminal and a source terminal of the transistor Mn1 to remain larger than a threshold voltage of the transistor Mn1. The higher voltage difference across the gate terminal and the source terminal of the transistor Mn1 allows for the charge pump circuit 700 to sustain a larger current loading.

Referring to FIG. 7B, in the second phase, the transistors Mn2, Mp1, Mg4, and Mg1 are turned on, and the transistors Mp2, Mn1, Mg3, and Mg2 are turned off, thereby isolating the gate terminal of the transistor Mp1 from the node N2. In the second phase, the clock signal CLKB is provided at the first logic state. For example, as shown in FIG. 7C, the clock signal CLKB of the second phase may be at "logic low" (e.g., 0 V). In the second phase, the clock signal CLK is provided at the second logic state. For example, as shown in FIG. 7C, the clock signal CLK of the second phase may be at "logic high" (e.g., VDDIO). The clock signal CLKB and the clock signal CLK can be logically inverse to each other. For example, as described with respect to FIG. 7A, in the first phase, the clock signal CLKB is provided at the first logic state (e.g., "logic high," VDDIO, etc.) and the clock signal CLK is provided at the second logic state (e.g., "logic low," 0 V, etc.).

In the second phase, a current 760 flowing through the transistor Mn2 and a current 765 flowing through the assist transistor Mg1 can charge the charge transfer capacitor Cp2. As discussed with respect to FIG. 7A, the charge transfer capacitor Cp2 charged in the second phase can be used to pump the input voltage VSS to the output voltage VOUT in the first phase. Likewise, the charge pump circuit 700, with the charge transfer capacitor Cp1 that has been charged in the first phase, can output a current 770 through the transistor Mp1 and the input node (that is, a negative voltage at the output node). For example, the charge pump circuit 700 can pump a first voltage (e.g., VSS) at the input node into a second voltage (e.g., VOUT) at the output node, the second voltage being a negative voltage lower than the first voltage. For example, the second voltage (e.g., VOUT<0) can be a multiply of the first voltage (e.g., VSS<0). For example, VOUT=2×VSS.

In the second phase, the assist transistor Mg2 being turned off can separate the node NG1P from the node N2, thereby keeping the node NG1P at a lower voltage than the node N2. For example, as shown in FIG. 7C, the voltage 715 of the node NG1P can be kept at a lower voltage than a voltage 717 of the node N2. This allows a voltage difference across the gate terminal and a source terminal of the transistor Mp1 to remain larger than a threshold voltage of the transistor Mp1. The higher voltage difference across the gate terminal and a source terminal of the transistor Mp1 allows for the charge pump circuit 700 to sustain a larger current loading.

As shown in FIG. 7A and FIG. 7B, the transistors Mp1, Mn2, Mg4, and Mg1 can be configured to be activated alternately (e.g., operate in the first phase and the second phase alternately) with respect to the transistors Mn1, Mp2, Mg3, and Mg2 so as to boost an output voltage (e.g., VOUT) as a multiply of an input voltage (e.g., VSS). For example, the alternating clock signals CLK and CLKB, which are inverse to each other, can be provided to configure the charge pump circuit 700 to operate in the first phase and the second phase.

Figure 8A:
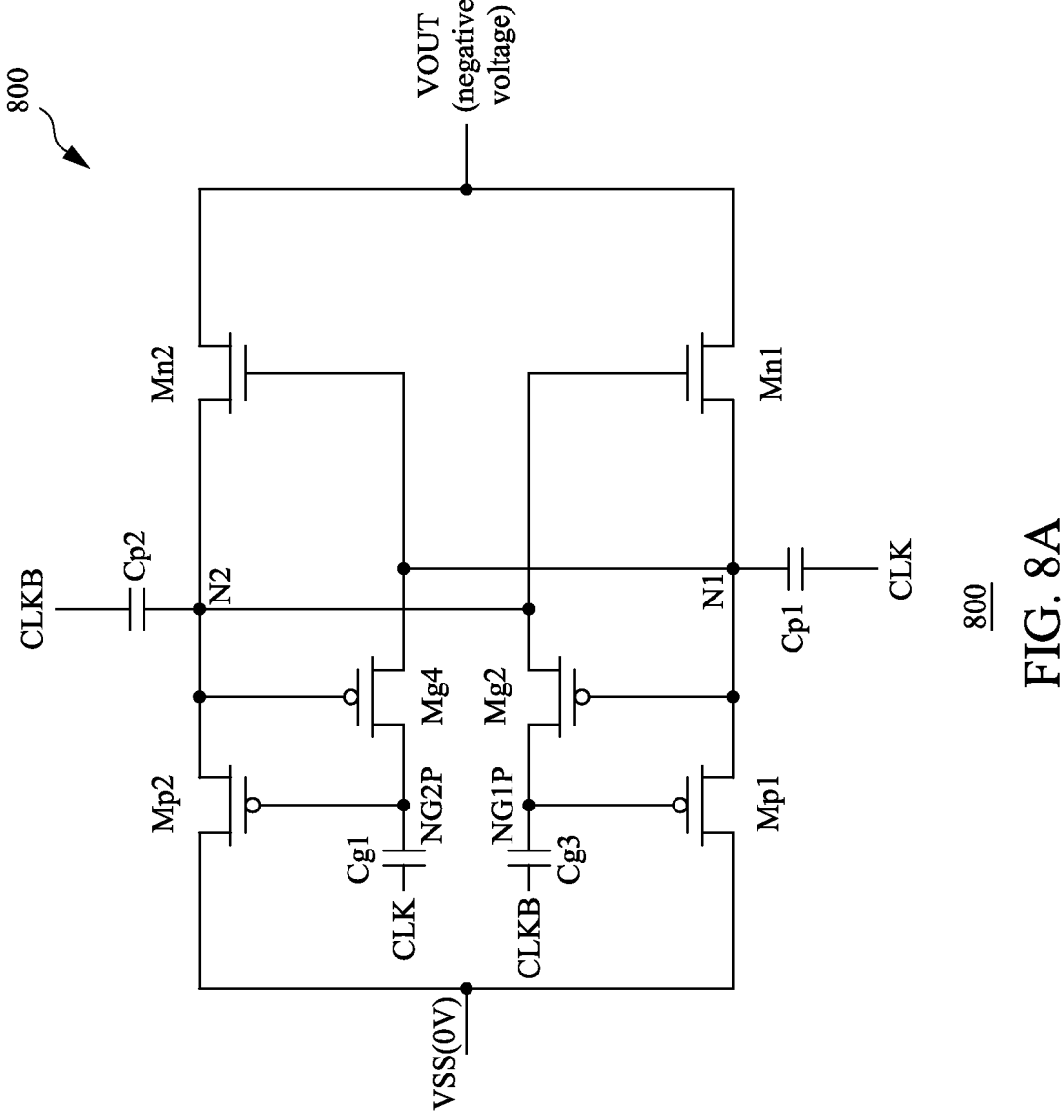
FIG. 8A illustrates a schematic diagram of an example charge pump circuit that can be included in the memory device of FIG. 1, in accordance with some embodiments.
Figure 8B:
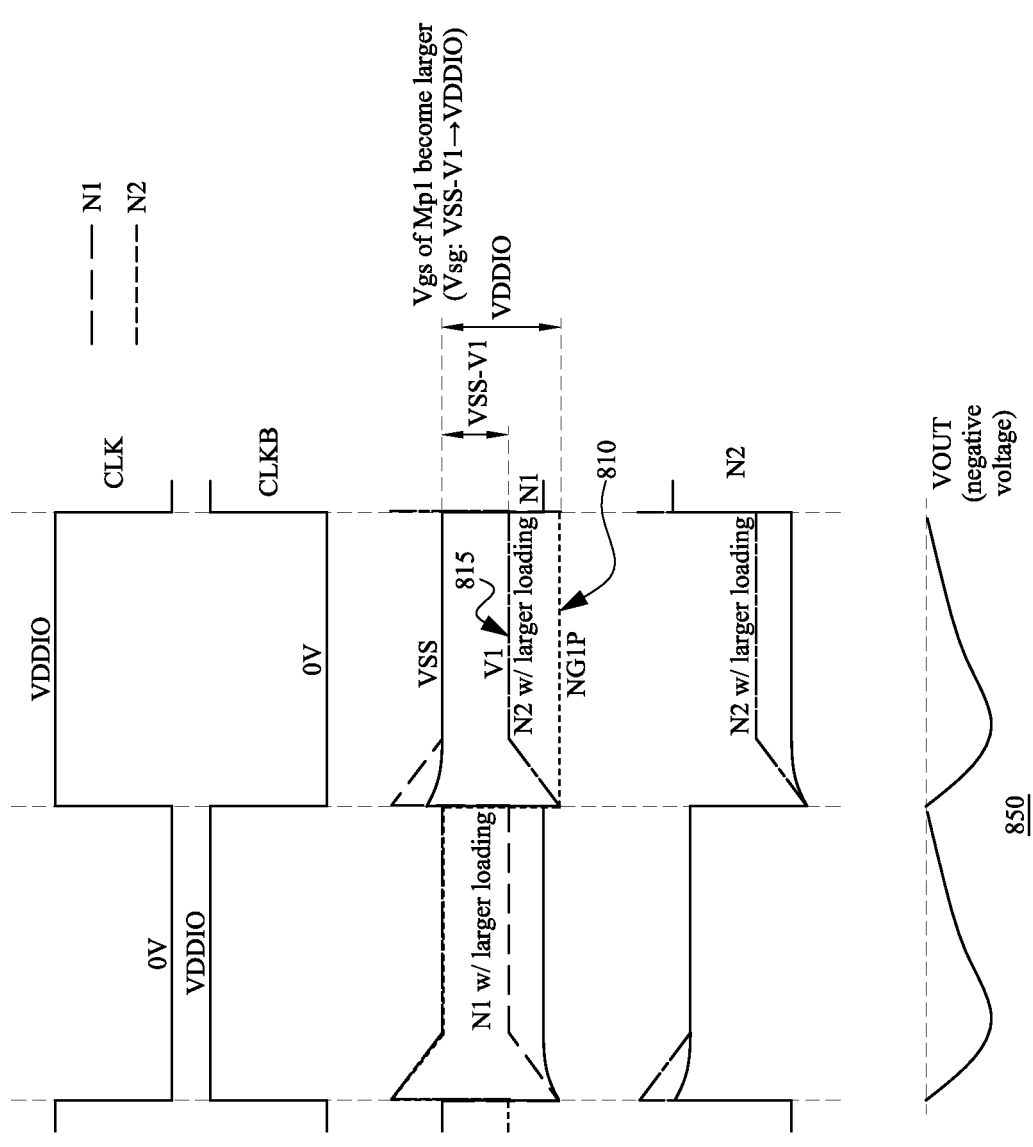
FIG. 8B illustrates an example waveform associated with the charge pump circuit of FIG. 8A, in accordance with some embodiments.

FIG. 8A illustrates a schematic diagram of an example charge pump circuit 800 that can be included in the memory device of FIG. 1, in accordance with some embodiments. For example, the charge pump circuit 800 may be a part of the voltage provision circuit 110. FIG. 8B illustrates an example waveform 850 associated with the charge pump circuit of FIG. 8A, in accordance with some embodiments.

The charge pump circuit 800 may be substantially similar to and/or incorporate features of the charge pump circuit 700, without one or more assist transistors (e.g., the transistors Mg1, and Mg3) and one or more assist capacitors (Cg1 and Cg3). That is, the charge pump circuit 800, which can output a negative voltage lower than an input voltage, can include the assist transistors Mg2 and Mg4 and the assist capacitors Cg2 and Cg4 only at one side of the charge pump circuit 800. For example, as shown in FIG. 8A, the charge pump circuit 800 includes the assist transistors Mg2 and Mg4 and the assist capacitors Cg2 and Cg4 only at a p-type side of the charge pump circuit 800, in which the transistors Mp1, Mp2, Mg2, and Mg4 can be PMOS devices. In this case, in a first phase, the assist transistor Mg2 being turned off can separate the node NG1P from the node N2, thereby keeping the node NG1P at a lower voltage than the node N2. For example, as shown in FIG. 8B, the voltage 810 of the node NG1P can be kept at a lower voltage than a voltage 815 of the node N2. In a second phase, the assist transistor Mg4 being turned off can separate the node NG2P from the node N1. The transistors Mp1 and Mg4 can be configured to be activated alternately (e.g., operate in the first phase and the second phase alternately) with respect to the transistors Mp2 and Mg2 so as to boost an output voltage (e.g., VOUT) as a multiply of an input voltage (e.g., VSS). For example, the alternating clock signals CLK and CLKB, which are inverse to each other, can be provided to configure the charge pump circuit 800 to operate in the first phase and the second phase.

In some embodiments, although not depicted in FIG. 8A and FIG. 8B, the charge pump circuit 800 can include the assist transistors Mg1 and Mg3 and the assist capacitors Cg1 and Cg3 only at an n-type side of the charge pump circuit 800, in which the transistors Mn1, Mn2, Mg1, and Mg3 can be NMOS devices.

FIG. 9 illustrates a flow chart of an example method 900 for operating an example charge pump circuit that can be included in the memory device of FIG. 1, in accordance with some embodiments. At least an operation of the method 900 can be performed with the charge pump circuit disclosed herein (e.g., 200 of FIG. 2, 700 of FIGS. 7A-7B, etc.). It is noted that the method 900 is merely an example and is not intended to limit the present disclosure. Accordingly, it is understood that additional operations may be provided before, during, and after the method 900 of FIG. 9, and that some other operations may only be briefly described herein.

The method 900 starts with operation 910 of providing a charge pump circuit (e.g., the charge pump circuit 200, 600, 700, 800) including first, second, third, and fourth transistors (e.g., transistors Mn2, Mp2, Mn1, and Mp1, etc.), and first and second charge capacitors (e.g., capacitors Cp1, Cp2, etc.). At operation 910, respective gate terminals of the first transistor and second transistor can be coupled to a first node (e.g., N2) configured to receive a first clock signal through a first charge capacitor, and respective gate terminals of the third transistor and fourth transistor can be coupled to a second node (e.g., N1) configured to receive a second clock signal that is logically inverse to the first clock signal through a second charge capacitor. In some embodiments, operation 910 can include providing a fifth transistor (e.g., assist transistor Mg3). The fifth transistor has its source/drain terminals connected to the gate terminal of the first transistor and the first node, respectively. In some embodiments, operation 910 can include providing a sixth (e.g., assist transistor Mg4) transistor. The sixth transistor has its source/drain terminals connected to the first node and the gate terminal of the second transistor, respectively. In some embodiments, operation 910 can include providing a seventh transistor (e.g., assist transistor Mg1). The seventh transistor has its source/drain terminals connected to the gate terminal of the third transistor and the second node, respectively. In some embodiments, operation 910 can include providing an eighth transistor (e.g., assist transistor Mg2). The eighth transistor has its source/drain terminals connected to the second node and the gate terminal of the fourth transistor, respectively. In some embodiments, the first, second, third, and fourth assist capacitors have a first size and the first and second charge capacitors have a second size, wherein the first size is smaller than the second size. In some embodiments, the fifth, sixth, seventh, and eighth transistor have a first size and the first, second, third, and fourth transistors have a second size, wherein the first size is smaller than the second size. In some embodiments, the first, third, fifth, and seventh transistors have a first conductive type, and the second, fourth, sixth, and eighth transistors have a second conductive type different from the first conductive type.

The method 900 can continue to operation 920 of charging, during a first phase, the first node and the second node to a first multiply of a supply voltage and to the supply voltage, respectively, through activating the second and third transistors and deactivating the first and fourth transistors. At operation 920, the first node is isolated from a gate terminal of the third transistor by deactivating at least a fifth transistor (e.g., assist transistor Mg1). The fifth transistor being turned off allows a voltage difference across the gate terminal and the source terminal of the corresponding transistor (e.g., transistor Mn1) to remain larger than a threshold voltage of the transistor. In some embodiments, the fifth transistor has its gate terminal, source terminal, and drain terminal connected to the second node, the first node, and the gate terminal of the third transistor, respectively.

The method 900 can continue to operation 930 of charging, during a second phase, the first node and the second node to the supply voltage and a second multiply of the supply voltage, respectively, through activating the first and fourth transistors and deactivating the second and third transistors. At operation 930, the first node is isolated from a gate terminal of the fourth transistor by deactivating at least a sixth transistor (e.g., assist transistor Mg2). The sixth transistor being turned off allows a voltage difference across the gate terminal and the source terminal of the corresponding transistor (e.g., transistor Mp1) to remain larger than a threshold voltage of the transistor. In some embodiments, the sixth transistor has its gate terminal, source terminal, and drain terminal connected to the second node, the first node, and the gate terminal of the fourth transistor, respectively. In some embodiments, the first, third, and fifth transistors each have an n-type conductivity, and the second, fourth, and sixth transistors each have a p-type conductivity.

In one aspect of the present disclosure, a circuit is disclosed. The circuit includes a first transistor and a second transistor coupled to each other in series between an input node and an output node, wherein respective gate terminals of the first transistor and second transistor are coupled to a first node configured to receive a first clock signal through a first charge capacitor; a third transistor and a fourth transistor coupled to each other in series between the input node and the output node, wherein respective gate terminals of the third transistor and fourth transistor are coupled to a second node configured to receive a second clock signal that is logically inverse to the first clock signal through a second charge capacitor; a fifth transistor having its source/drain terminals coupled between the gate terminal of the first transistor and the first node; a sixth transistor having its source/drain terminals coupled between the first node and the gate terminal of the second transistor; a seventh transistor having its source/drain terminals coupled between the gate terminal of the third transistor and the second node; and an eighth transistor having its source/drain terminals coupled between the second node and the gate terminal of the fourth transistor.

In another aspect of the present disclosure, a circuit is disclosed. The circuit includes a first charge capacitor having a first terminal and a second terminal coupled to a first clock signal and a first common node, respectively, wherein the first common node is coupled between a first transistor and a second transistor; a second charge capacitor having a first terminal and a second terminal coupled to a second clock signal and a second common node, respectively, wherein the second clock signal is logically inverse to the first clock signal, wherein the second common node is coupled between a third transistor and a fourth transistor; a fifth transistor having a gate terminal, a source terminal, and a drain terminal that are connected to the first common node, a gate terminal of the second transistor, and the second common node, respectively, wherein the fifth transistor and the second transistor both have a first conductive type; and a sixth transistor having a gate terminal, a source terminal, and a drain terminal that are connected to the second common node, a gate terminal of the fourth transistor, and the first common node, respectively, wherein the sixth transistor and the fourth transistor both have the first conductive type; wherein both of the second and third transistors are configured to be activated alternately with respect to both of the first and fourth transistors so as to boost an output voltage as a multiply of an input voltage.

In yet another aspect of the present disclosure, a method for fabricating semiconductor devices is disclosed. The method includes providing a charge pump circuit including first, second, third, and fourth transistors, and first and second charge capacitors, wherein the first and second transistors are coupled in series to each other at a first node and the third and fourth transistors are coupled in series to each other at a second node, and wherein the first node is coupled to a first clock signal through a first charge capacitor and the second node is coupled to a second clock signal through a second charge capacitor, the second clock signal being logically inverse to the first clock signal; charging, during a first phase, the first node and the second node to a first multiply of a supply voltage and to the supply voltage, respectively, through activating the second and third transistors and deactivating the first and fourth transistors; and charging, during a second phase, the first node and the second node to the supply voltage and a second multiply of the supply voltage, respectively, through activating the first and fourth transistors and deactivating the second and third transistors; wherein, during the first phase, the first node is isolated from a gate terminal of the third transistor by deactivating at least a fifth transistor, and wherein, during the second phase, the first node is isolated from a gate terminal of the fourth transistor by deactivating at least a sixth transistor.

As used herein, the terms "about" and "approximately" generally indicate the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit, comprising:

a first transistor and a second transistor coupled to each other in series between an input node and an output node, wherein respective gate terminals of the first transistor and second transistor are coupled to a first node configured to receive a first clock signal through a first charge capacitor;

a third transistor and a fourth transistor coupled to each other in series between the input node and the output node, wherein respective gate terminals of the third transistor and fourth transistor are coupled to a second node configured to receive a second clock signal that is logically inverse to the first clock signal through a second charge capacitor;

a fifth transistor having its source/drain terminals coupled between the gate terminal of the first transistor and the first node;

a sixth transistor having its source/drain terminals coupled between the first node and the gate terminal of the second transistor;

a seventh transistor having its source/drain terminals coupled between the gate terminal of the third transistor and the second node; and an eighth transistor having its source/drain terminals coupled between the second node and the gate terminal of the fourth transistor.

2. The circuit of claim 1, further comprising:

a first gate capacitor configured to couple the first clock signal to the gate terminal of the first transistor;

a second gate capacitor configured to couple the first clock signal to the gate terminal of the second transistor;

a third gate capacitor configured to couple the second clock signal to the gate terminal of the third transistor; and a fourth gate capacitor configured to couple the second clock signal to the gate terminal of the fourth transistor.

3. The circuit of claim 2, wherein the first, second, third, and fourth gate capacitors have a first size and the first and second charge capacitors have a second size, and wherein the first size is smaller than the second size.

4. The circuit of claim 1, wherein the fifth, sixth, seventh, and eighth transistor have a first size and the first, second, third, and fourth transistors have a second size, and wherein the first size is smaller than the second size.

5. The circuit of claim 1, wherein the first, third, fifth, and seventh transistors have a first conductive type, and the second, fourth, sixth, and eighth transistors have a second conductive type different from the first conductive type.

6. The circuit of claim 1, wherein, in a first phase in which the first clock signal is provided at a first logic state, the first, fourth, sixth, and seventh transistors are turned off and the second, third, fifth, and eighth transistors are turned on, thereby at least isolating the gate terminal of the third transistor from the second node.

7. The circuit of claim 6, wherein, in the first phase, a voltage difference across the gate terminal and a source terminal of the third transistor is enlarged to remain larger than a threshold voltage of the third transistor.

8. The circuit of claim 6, wherein in a second phase in which the first clock signal is provided at a second logic state, the first, fourth, sixth, and seventh transistors are turned on, with the second, third, fifth, and eighth transistors being turned off, thereby at least isolating the gate terminal of the fourth transistor from the second node.

9. The circuit of claim 8, wherein, in the second phase, a voltage difference across the gate terminal and a source terminal of the fourth transistor is enlarged to remain larger than a threshold voltage of the fourth transistor.

10. The circuit of claim 1, wherein a first voltage at the input node is configured to be pumped to a second voltage at the output node, the second voltage being a multiply of the first voltage.

11. A circuit, comprising:

a first charge capacitor having a first terminal and a second terminal coupled to a first clock signal and a first common node, respectively, wherein the first common node is coupled between a first transistor and a second transistor;

a second charge capacitor having a first terminal and a second terminal coupled to a second clock signal and a second common node, respectively, wherein the second clock signal is logically inverse to the first clock signal, wherein the second common node is coupled between a third transistor and a fourth transistor;

a fifth transistor having a gate terminal, a source terminal, and a drain terminal that are connected to the first common node, a gate terminal of the second transistor, and the second common node, respectively, wherein the fifth transistor and the second transistor both have a first conductive type; and a sixth transistor having a gate terminal, a source terminal, and a drain terminal that are connected to the second common node, a gate terminal of the fourth transistor, and the first common node, respectively, wherein the sixth transistor and the fourth transistor both have the first conductive type;

wherein both of the second and third transistors are configured to be activated alternately with respect to both of the first and fourth transistors so as to boost an output voltage as a multiply of an input voltage.

12. The circuit of claim 11, further comprising:

a seventh transistor having a gate terminal, a source terminal, and a drain terminal that are connected to the second common node, a gate terminal of the first transistor, and the first common node, respectively, wherein the seventh transistor and the first transistor both have a second conductive type different from the first conductive type; and an eighth transistor having a gate terminal, a source terminal, and a drain terminal that are connected to the first common node, a gate terminal of the third transistor, and the second common node, respectively, wherein the eighth transistor and the third transistor both have the second conductive type.

13. The circuit of claim 11, wherein the fifth and sixth transistors have a first size, and the first, second, third, and fourth transistors have a second size, and wherein the first size is smaller than the second size.

14. The circuit of claim 11, further comprising:

a first gate capacitor configured to couple the first clock signal to the gate terminal of the second transistor; and a second gate capacitor configured to couple the second clock signal to the gate terminal of the fourth transistor.

15. The circuit of claim 14, wherein the first and second gate capacitors have a first size and the first and second charge capacitors have a second size, and wherein the first size is smaller than the second size.

16. The circuit of claim 11, wherein a first voltage difference is larger than a second voltage difference, and wherein the first voltage difference is across a gate terminal and a source terminal of the third transistor, and the second voltage difference is across the gate terminal and the source terminal of the fourth transistor.

17. The circuit of claim 16, wherein the first voltage difference is larger than a threshold voltage of the fourth transistor.

18. A method for operating a charge pump circuit, comprising:

providing a charge pump circuit including first, second, third, and fourth transistors, and first and second charge capacitors, wherein the first and second transistors are coupled in series to each other at a first node and the third and fourth transistors are coupled in series to each other at a second node, and wherein the first node is coupled to a first clock signal through a first charge capacitor and the second node is coupled to a second clock signal through a second charge capacitor, the second clock signal being logically inverse to the first clock signal;

charging, during a first phase, the first node and the second node to a first multiply of a supply voltage and to the supply voltage, respectively, through activating the second and third transistors and deactivating the first and fourth transistors; and charging, during a second phase, the first node and the second node to the supply voltage and a second multiply of the supply voltage, respectively, through activating the first and fourth transistors and deactivating the second and third transistors;

wherein, during the first phase, the first node is isolated from a gate terminal of the third transistor by deactivating at least a fifth transistor, and wherein, during the second phase, the first node is isolated from a gate terminal of the fourth transistor by deactivating at least a sixth transistor.

19. The method of claim 18, wherein the fifth transistor has its gate terminal, source terminal, and drain terminal connected to the second node, the first node, and the gate terminal of the third transistor, respectively, and wherein the sixth transistor has its gate terminal, source terminal, and drain terminal connected to the second node, the first node, and the gate terminal of the fourth transistor, respectively.

20. The method of claim 18, wherein the first, third, and fifth transistors each have an n-type conductivity, and the second, fourth, and sixth transistors each have a p-type conductivity.

\* \* \* \* \*